(12) United States Patent
Honda

(10) Patent No.: US 10,353,479 B2
(45) Date of Patent: Jul. 16, 2019

(54) DISPLAY APPARATUS AND DISPLAY APPARATUS CONTROL METHOD

(71) Applicant: SEIKO EPSON CORPORATION, Tokyo (JP)

(72) Inventor: Yasuhiro Honda, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 7 days.

(21) Appl. No.: 15/522,426

(22) PCT Filed: Nov. 5, 2015

(86) PCT No.: PCT/JP2015/005540
§ 371 (c)(1),
(2) Date: Apr. 27, 2017

(87) PCT Pub. No.: WO2016/075905
PCT Pub. Date: May 19, 2016

(65) Prior Publication Data
US 2017/0315619 A1    Nov. 2, 2017

(30) Foreign Application Priority Data
Nov. 13, 2014 (JP) ................. 2014-231010

(51) Int. Cl.
*G06F 3/01* (2006.01)
*G06F 3/0481* (2013.01)
*G06F 3/038* (2013.01)

(52) U.S. Cl.
CPC ............ *G06F 3/017* (2013.01); *G06F 3/011* (2013.01); *G06F 3/038* (2013.01); *G06F 3/0481* (2013.01)

(58) Field of Classification Search
None
See application file for complete search history.

(56) References Cited

U.S. PATENT DOCUMENTS 9,244,545 B2 *   1/2016   Hinckley ................ G06F 3/038
2009/0095540 A1   4/2009   Zachut et al.
(Continued)

FOREIGN PATENT DOCUMENTS

JP    3758866 B2    3/2006
JP    4851547 B2    1/2012
(Continued)

OTHER PUBLICATIONS

Dec. 8, 2015 International Search Report issued in International Patent Application No. PCT/JP2015/005540.
(Continued)

*Primary Examiner* — Kenneth B Lee, Jr.
(74) *Attorney, Agent, or Firm* — Oliff PLC

(57) ABSTRACT

A display apparatus, which improves operability in a case where operations are performed by plural indicators, and a display apparatus control method. A detection unit that detects an operation performed by a first indicator on a screen and an operation performed by a second indicator on the screen, and an invalid determination unit that receives an indication which causes the operations to be invalid are included. In a case where the indication is received after the detection unit detects the operation performed by the second indicator, and, thereafter, detects the operation performed by the first indicator, the invalid determination unit causes the operation performed by the second indicator to be invalid.

5 Claims, 6 Drawing Sheets

(56) References Cited

U.S. PATENT DOCUMENTS

| | | |
|---|---|---|
| 2012/0262407 A1 | 10/2012 | Hinckley et al. |
| 2013/0147711 A1* | 6/2013 | Njolstad ............... G06F 3/0425 345/158 |
| 2014/0125629 A1 | 5/2014 | Miyamoto et al. |
| 2014/0132561 A1 | 5/2014 | Miyamoto et al. |
| 2014/0139482 A1 | 5/2014 | Miyamoto et al. |
| 2015/0067579 A1* | 3/2015 | Jeong .................... G06F 3/0488 715/781 |

FOREIGN PATENT DOCUMENTS

| | | |
|---|---|---|
| JP | 5350437 B2 | 11/2013 |
| JP | 5372000 B2 | 12/2013 |
| JP | 2014-102628 A | 6/2014 |

OTHER PUBLICATIONS

Jun. 4, 2018 Search Report issued in European Patent Application No. 15859257.6.

\* cited by examiner

| OPERATOR ID | POSITION INFORMATION (HORIZONTAL, VERTICAL) | PERSON AREA RANGE | FEATURE AMOUNT | OPERATION INFORMATION | TRACE DATA | DATE AND TIME INFORMATION |
|---|---|---|---|---|---|---|
| 001 | (238,158) | (500,112) ~ (302,625) (210,180) ~ (202,897) | INTERVAL BETWEEN BOTH EYES LENGTH OF FACE WIDTH OF FACE ... | INPUT LETTER (FIRST INDICATOR) | (−385,251) ... (−256,280) | 2014/05/25 AM10:35:40 |
| 001 | (238,158) | (500,112) ~ (302,625) (210,180) ~ (202,897) | INTERVAL BETWEEN BOTH EYES LENGTH OF FACE WIDTH OF FACE ... | ENLARGE (SECOND INDICATOR) | (121,365) ... (547,690) | 2014/05/25 AM10:36:10 |
| ... | ... | ... | ... | ... | ... | ... |
| 002 | (165,584) | (2650,225) ~ (258,458) (012,362) ~ (872,665) | INTERVAL BETWEEN BOTH EYES LENGTH OF FACE WIDTH OF FACE ... | INVALID INDICATION (SECOND INDICATOR) | (222,257) ... (684,114) | 2014/05/25 AM10:40:45 |
| ... | ... | ... | ... | ... | ... | ... |

FIG. 3

DISPLAY APPARATUS AND DISPLAY APPARATUS CONTROL METHOD

TECHNICAL FIELD

The present invention relates to a display apparatus and a display apparatus control method.

BACKGROUND ART

In the related art, an apparatus is proposed that detects an operation performed by an indicator and displays an image corresponding to the detected operation (for example, refer to PTL 1). PTL 1 discloses an apparatus that is capable of performing an operation according to two types of indication devices.

CITATION LIST

Patent Literature

PTL 1: JP-A-2014-102628

SUMMARY OF INVENTION

Technical Problem

In addition, in the related art, there is an undo operation that causes an input operation to be invalid in a case where it is desired to cancel the operation which is input once. However, in a case where the undo operation is input in a display apparatus that is capable of performing operations by plural indicators, cancellation of an operation input immediately before the undo operation is not always according to an intention of an operator. In contrast, for example, a method of designating an operation to be invalid whenever the undo operation is performed takes labor.

The invention is made in view of the above-described circumstances, and an object of the invention is to provide a display apparatus, which is capable of improving operability in a case where operations are performed by plural indicators, and a display apparatus control method.

Solution to Problem

In order to achieve the above object, a display apparatus according to the invention includes: a detection unit that detects an operation performed by a first indicator on an operation surface, and an operation performed by a second indicator on the operation surface; and a control unit that receives an indication which causes the operations to be invalid, in which, in a case where the indication is received after the detection unit detects the operation performed by the second indicator and, thereafter, detects the operation performed by the first indicator, the control unit causes the operation performed by the second indicator to be invalid.

According to the invention, it is possible to improve operability in a case where operations are performed by plural indicators.

In addition, the invention is directed to the display apparatus in which the control unit performs a first process and a second process by switching between the first process and the second process, the first process is a process that causes the operation performed by the second indicator to be invalid in the case where the indication is received after the detection unit detects the operation performed by the second indicator, and, thereafter, detects the operation performed by the first indicator, and the second process is a process that causes the operation performed by the first indicator to be invalid in the case where the indication is received after the detection unit detects the operation performed by the second indicator, and, thereafter, detects the operation performed by the first indicator.

According to the invention, it is possible to select an operation of an indicator to be invalid.

In addition, the invention is directed to the display apparatus in which the detection unit detects the operation performed by the first indicator in association with an operator who operates the first indicator, and detects the operation performed by the second indicator in association with an operator who operates the second indicator, and, in a case where the detection unit detects a first operation performed by the second indicator, detects the operation performed by the first indicator, detects a second operation performed by the second indicator, and the second operation is an operation that shows the indication, the control unit causes the first operation to be invalid if it is determined that an operator of the second operation is the same as an operator of the first operation, and the control unit does not cause the first operation to be invalid if it is determined that the operator of the second operation is not the same as the operator of the first operation.

According to the invention, in the case where the operator of the second operation is the same as the operator of the first operation, it is possible to cause the first operation performed by the second indicator to be invalid. In addition, it is possible to prevent the first operation performed by the second indicator from being caused to be invalid by another operator.

In addition, the invention is directed to the display apparatus in which, in the case where the operator of the second operation is the same as the operator of the first operation, the control unit causes the first operation to be invalid until preset time elapses after the detection unit detects the first operation, and, in a case where a third operation detected by the detection unit and performed by the second indicator is an operation that shows the indication which causes the first operation to be invalid, the control unit causes the first operation to be invalid even though an operator of the third operation is not the same as the operator of the first operation after the preset time elapses.

According to the invention, it is possible to prevent the first operation from being invalid by another operator until the preset time elapses. In addition, after the preset time elapses, it is possible to prevent a situation, in which the first operation cannot be caused to be invalid by operators other than an operator who performed the first operation, from occurring.

In addition, the invention is directed to the display apparatus, in which the display apparatus further includes a storage unit that stores operation history information in which the operation detected by the detection unit and performed by the second indicator is associated with the operator who performs the operation, and the control unit deletes information of the operator who performs the operation from the operation history information in a case where the preset time elapses.

According to the invention, it is possible to realize a process that an operator other than the operator who performed the operation causes the operation performed by the second indicator to be invalid with a simple process.

A display apparatus control method according to the invention includes: detecting an operation performed by a first indicator on an operation surface, and an operation performed by a second indicator on the operation surface; and receiving an indication that causes the operations to be invalid, in which the operation performed by the second indicator is caused to be invalid in a case where the indication is received after the operation performed by the second indicator is detected, and, thereafter, the operation performed by the first indicator is detected.

According to the invention, it is possible to improve operability in a case where operations are performed by plural indicators.

BRIEF DESCRIPTION OF DRAWINGS

FIG. 3 is a view illustrating an operation history table.

DESCRIPTION OF EMBODIMENTS

Figure 1:
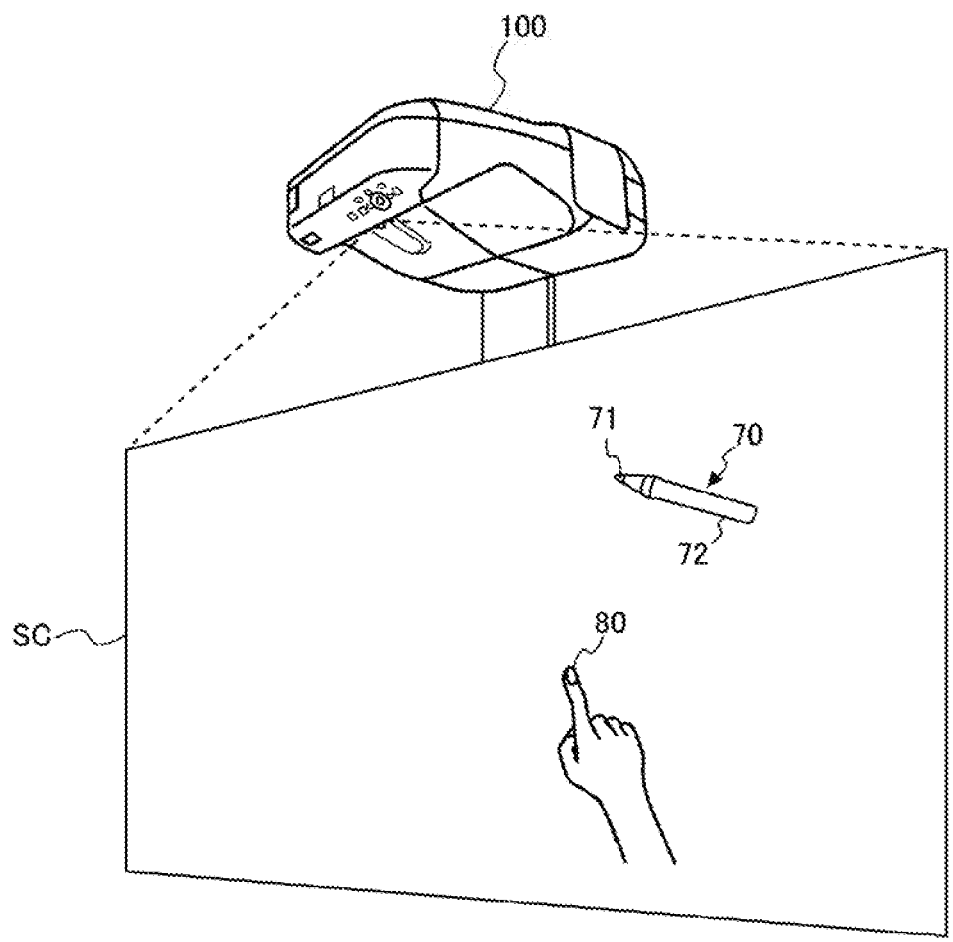
FIG. 1 is a view illustrating an appearance and a using state of a projector.

FIG. 1 is a view illustrating an installation state of a projector 100.

The projector 100 is installed right over or obliquely upward of a screen SC (operation surface), and projects an image toward the screen SC which is installed obliquely downward. The screen SC is a flat plate or a curtain which is fixed to a wall surface or installed on a floor surface. The invention is not limited to the example, and it is possible to use the wall surface as the screen SC. In this case, the projector 100 may be attached to an upper part of the wall surface which is used as the screen SC.

The projector 100 is connected to a personal computer (PC), a video reproducing device, a DVD reproducing device, or an image supply device such as a Blu-ray (registered trademark) Disc (Blu-ray disc) reproducing device. The projector 100 projects an image on the screen SC based on an analog image signal or digital image data supplied from the image supply device. In addition, the projector 100 may read image data which is stored in a built-in storage unit 60 (FIG. 2) or an externally connected storage medium, and may display the image on the screen SC based on the image data.

The projector 100 detects an operation performed on the screen SC by an operator. A pen type first indicator 70 or a second indicator 80, which is a finger of the operator, is used for the operation performed on the screen SC. In addition, the operation performed on the screen SC includes an operation that designates (indicates) a fixed position on the screen SC by the first indicator 70 or the second indicator 80 and an operation that consecutively indicates different positions of the screen SC. The operation that designates (indicates) a fixed position on the screen SC is an operation that causes the first indicator 70 or the second indicator 80 to be in contact with the fixed position on the screen SC for a predetermined time. In addition, the operation that consecutively indicates different positions on the screen SC is an operation that draws a letter, a figure, or the like by moving the first indicator 70 or the second indicator 80 while causing the first indicator 70 or the second indicator 80 to be in contact with the screen SC. In addition, the operation performed on the screen SC by the second indicator 80 includes a gesture (motion). The gesture includes an operation, which draws a symbol and a letter in the air while the second indicator 80 is not contact with the screen SC, and an operation such as a pinch-out or pinch-in operation.

The projector 100 detects an operation which is performed by the operator using the first indicator 70 or the second indicator 80, and reflects the detected operation to a display image on the screen SC. Furthermore, the projector 100 may behave as a pointing device by detecting an indication position, and may output coordinates of the indication position on the screen SC. In addition, it is possible to cause the projector 100 to perform a Graphical User Interface (GUI) operation using the coordinates.

Figure 2:
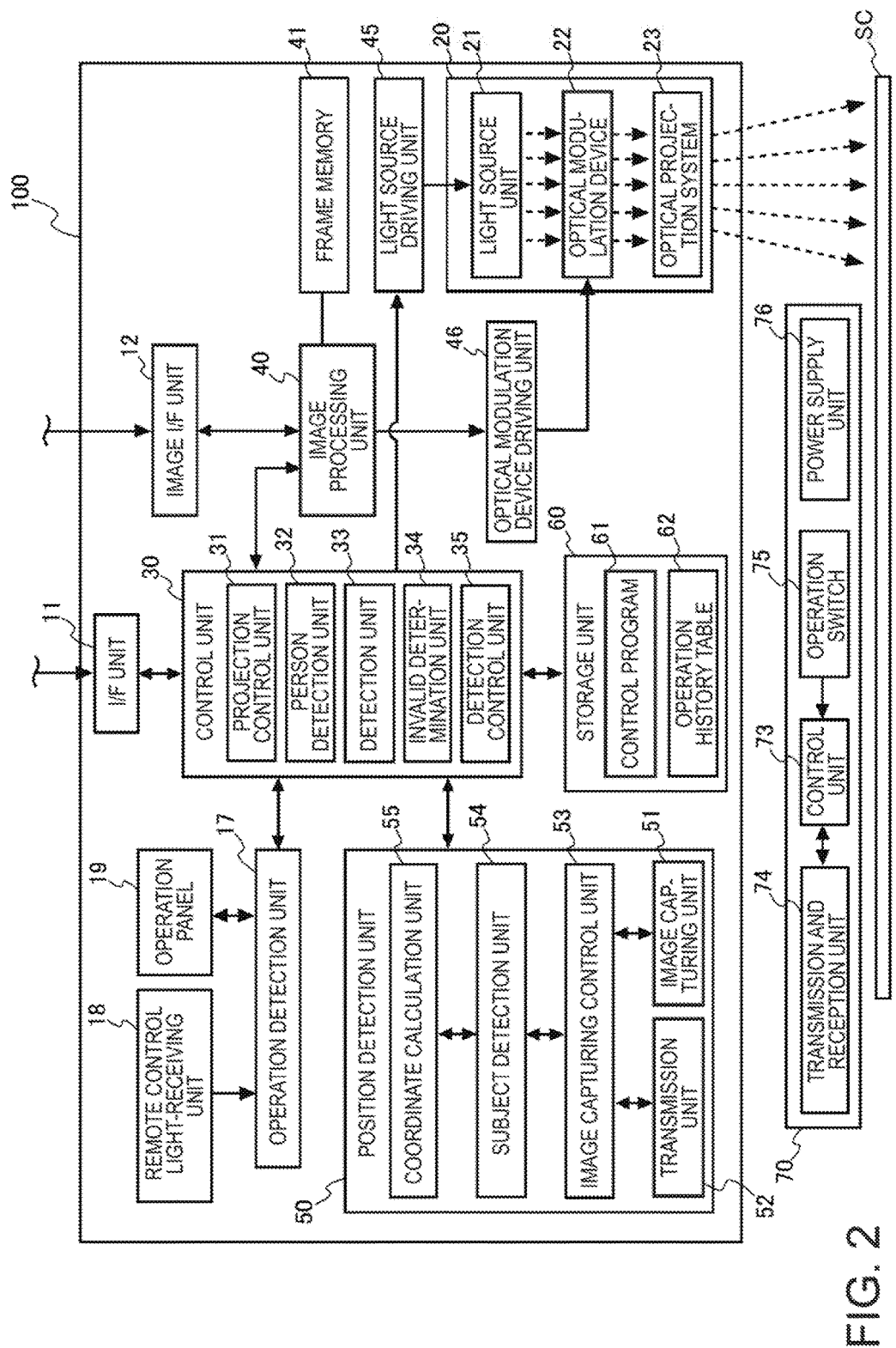
FIG. 2 is a functional block diagram illustrating the projector and a first indicator.

FIG. 2 is a configuration diagram illustrating a configuration of the projector 100.

The projector 100 includes an interface (I/F) unit 11 and an image interface (I/F) unit 12 as interfaces which are connected to an external device. The I/F unit 11 and the image I/F unit 12 may include connectors for wired connection, and may include interface circuits corresponding to the connectors. In addition, the I/F unit 11 and the image I/F unit 12 may include wireless communication interfaces. The connectors for wired connection and the interface circuits are in conformity to a wired LAN, IEEE1394, a USB, and the like. In addition, the wireless communication interfaces are in conformity to a wireless LAN and a Bluetooth (registered trademark), and the like. It is possible to use an interface for image data, such as an HDMI (registered trademark) interface, as the image I/F unit 12. The image I/F unit 12 may include an interface to which voice data is input.

The I/F unit 11 is an interface that transmits and receives various types of data with an external device such as a PC. The I/F unit 11 inputs and outputs data which is relevant to projection of an image, data which sets a behavior of the projector 100, and the like. A control unit 30 which will be described later has a function that transmits and receives data to and from the external device through the I/F unit 11.

The image I/F unit 12 is an interface to which the digital image data is input. The projector 100 according to the embodiment projects an image based on the digital image data which is input through the image I/F unit 12. The projector 100 may have a function that projects an image based on an analog image signal. In this case, the image I/F unit 12 may include an interface for an analog image and an A/D conversion circuit that converts the analog image signal into the digital image data.

The projector 100 includes a projection unit 20 that forms an optical image. The projection unit 20 includes a light source unit 21, an optical modulation device 22, and an optical projection system 23. The light source unit 21 includes a light source which is formed by a xenon lamp, an extra-high pressure mercury lamp, a Light Emitting Diode (LED), a laser light source, or the like. In addition, the light source unit 21 may include a reflector and an auxiliary reflector that guides light emitted from the light source to the optical modulation device 22. Furthermore, the projector 100 may include a lens group (not shown in the drawing) that increases optical characteristics of projection light, a polarizing plate, a dimmer element that reduces the quantity of light emitted from the light source on a route which reaches the optical modulation device 22, or the like.

The optical modulation device 22 includes, for example, three transmission-type liquid crystal panels corresponding to three primary colors of RGB, and generates image light by modulating light which passes through the liquid crystal panels. Light from the light source unit 21 is separated into three colored light of RGB, and respective pieces of colored light are incident into respective relevant liquid crystal panels. The respective pieces of colored light, which pass through the respective liquid crystal panels and are modulated, are synthesized by a synthesis optical system, such as a cross dichroic prism, and are emitted to the optical projection system 23.

The optical projection system 23 includes a lens group that guides image light, which is modulated by the optical modulation device 22, in a direction of the screen SC and forms an image on the screen SC. In addition, the optical projection system 23 may include a zoom mechanism that expands and reduces a display image on the screen SC and adjusts focus, and a focus adjustment mechanism that adjusts focus. In a case where the projector 100 is a short focus type, the optical projection system 23 may include a concave mirror that reflects image light toward the screen SC.

The projection unit 20 is connected to a light source driving unit 45 that lights up the light source unit 21 under the control of the control unit 30, and an optical modulation device driving unit 46 that causes the optical modulation device 22 to behave under the control of the control unit 30. The light source driving unit 45 may have a function that switches between lighting-up and lighting-off of light source unit 21 and adjusts the quantity of light of the light source unit 21.

The projector 100 includes an image processing system that processes an image which is projected by the projection unit 20. The image processing system includes the control unit 30 that controls the projector 100, the storage unit 60, an operation detection unit 17, an image processing unit 40, the light source driving unit 45, and the optical modulation device driving unit 46. In addition, a frame memory 41 is connected to the image processing unit 40, and the position detection unit 50 is connected to the control unit 30. Each of the units may be included in the image processing system.

The control unit 30 controls each of the units of the projector 100 by executing a prescribed control program 61. The storage unit 60 stores a control program 61 that is executed by the control unit 30, an operation history table 62, and data that is processed by the control unit 30 in a non-volatile manner. The operation history table 62 will be described in detail later.

The image processing unit 40 processes the image data that is input through the image I/F unit 12 and outputs an image signal to the optical modulation device driving unit 46 under the control of the control unit 30. A process performed by the image processing unit 40 includes a process that distinguishes between a 3D (solid) image and a 2D (plane) image, a resolution conversion process, a frame rate conversion process, a distortion correction process, a digital zoom process, a color tone correction process, a brightness correction process, and the like. The image processing unit 40 performs a process designated by the control unit 30, and performs a process using a parameter which is input from the control unit 30 if necessary. In addition, it is apparent that it is possible to combine and perform plural processes thereof.

The image processing unit 40 is connected to the frame memory 41. The image processing unit 40 deploys the image data which is input from the image input I/F 12 in the frame memory 41, and performs the various types of processes on the deployed image data. The image processing unit 40 reads the image data, on which the process is performed, from the frame memory 41, generates R, G, and B image signals corresponding to the image data, and outputs the R, G, and B image signals to the optical modulation device driving unit 46.

The optical modulation device driving unit 46 is connected to the liquid crystal panels of the optical modulation device 22. The optical modulation device driving unit 46 drives the liquid crystal panels based on the image signals which are input from the image processing unit 40, and draws images on the respective liquid crystal panels.

The operation detection unit 17 is connected to a remote control light-receiving unit 18 and an operation panel 19 which function as input devices, and detects an operation through the remote control light-receiving unit 18 and the operation panel 19.

The remote control light-receiving unit 18 receives an infrared signal that is transmitted by a remote controller (not shown in the drawing), which is used by an operator of the projector 100, according to a button operation. The remote control light-receiving unit 18 decodes the infrared signal received from the remote controller, generates operation data which indicates operation content of the remote controller, and outputs the operation data to the control unit 30.

The operation panel 19 is provided in an exterior housing of the projector 100, and includes various types of switches and indicator lamps. The operation detection unit 17 appropriately lights up and lights off the indicator lamps of the operation panel 19 according to a behavior state and a setting state of the projector 100 under the control of the control unit 30. In a case where a switch of the operation panel 19 is operated, operation data corresponding to the operated switch is output to the control unit 30 from the operation detection unit 17.

The position detection unit 50 detects an indication position by at least anyone of the first indicator 70 and the second indicator 80. The position detection unit 50 includes respective units, that is, an image capturing unit 51, a transmission unit 52, an image capturing control unit 53, a subject detection unit 54, and a coordinate calculation unit 55.

The image capturing unit 51 forms a captured image that is acquired by capturing a range, which includes the screen SC and peripheral areas thereof, as an image capturing range. The image capturing unit 51 is capable of performing image capturing using infrared light and image capturing using visible light, respectively. Specifically, it is possible to form the image capturing unit 51 that includes an infrared imaging element which captures infrared light, a visible light imaging element which captures visible light, an infrared imaging element interface circuit, and a visible light imaging element interface circuit. In addition, the image capturing unit 51 may be formed to capture visible light and infrared light using one imaging element. In addition, for example, in a case where a filter that blocks a part of light which is incident into the imaging element is provided in the image capturing unit 51 and infrared light is received in the imaging element, a filter that mainly causes light in an infrared area to pass may be disposed in front of the imaging element. It is possible to use anyone of a CCD and a CMOS as the imaging element, and, in addition, it is possible to use another element.

An image capturing direction and an image capturing range (angle of view), which is acquired in a case where an image is captured using infrared light of the image capturing unit 51, face a direction which is the same or approximately the same as that of the optical projection system 23, and cover a range in which the optical projection system 23 projects an image on the screen SC. In the same manner, an image capturing direction and an image capturing range, which is acquired in a case where an image is captured using visible light of the image capturing unit 51, face a direction which is the same or approximately the same as that of the optical projection system 23, and cover the range in which the optical projection system 23 projects the image on the screen SC. The image capturing unit 51 outputs data of the captured image which is captured using infrared light and data of the captured image which is captured using visible light, respectively.

The image capturing control unit 53 controls the image capturing unit 51 under the control of the control unit 30, and causes the image capturing unit 51 to capture an image. The image capturing control unit 53 acquires the data of the captured image of the image capturing unit 51, and outputs the data to the subject detection unit 54. The screen SC, the display image which is displayed on the screen SC, and an operator which exists in the image capturing range are photographed in the data of the captured image which is captured by the image capturing unit 51 using visible light. In addition, an image acquired using infrared light emitted from the first indicator 70 is photographed in the data of the captured image which is captured by the image capturing unit 51 using infrared light.

A transmission unit 52 transmits the infrared signal to the first indicator 70 under the control of the image capturing control unit 53. The transmission unit 52 includes a light source such as an infrared LED, and lights up and lights off the light source under the control of the image capturing control unit 53.

The data of the captured image from the image capturing control unit 53 is input to the subject detection unit 54. The subject detection unit 54 detects a person area, in which a person is photographed, from the data of the captured image which is input. The person area is an area which includes an image of a person in the captured image. It is possible to use a generally-known method in order to detect the person area using the subject detection unit 54. For example, the subject detection unit 54 detects an edge of the data of the captured image which is input, and detects an area which matches a shape of a person as the person area. In addition, the subject detection unit 54 may detect an area, in which color information (brightness, chromaticity, or the like) changes in prescribed time, and may detect an area whose size is equal to or larger than a prescribed value or an area, in which a chronological movement range of the detected area is included in a prescribed range, as the person area.

In addition, the subject detection unit 54 detects the second indicator 80 by detecting an image of a finger of the operator from the person area of the data of the captured image. The subject detection unit 54 detects an area, which is close to a shape and a feature of a predetermined finger, as an area of the second indicator 80 from the person area. The finger of the operator detected by the subject detection unit 54 may be anyone of one or more fingers, an entire hand, and a part of hand which includes fingers.

In addition, the subject detection unit 54 specifies a tip (fingertip) of a finger from the area of the detected second indicator 80, and detects a position of the specified tip of the finger as the indication position. The subject detection unit 54 calculates the coordinates of the indication position of the second indicator 80 using coordinates of the data of the captured image.

In addition, the subject detection unit 54 detects the distance between the detected second indicator 80 and the screen SC. The subject detection unit 54 determines a distance between the detected tip of the finger and the screen SC based on the data of the captured image. For example, the subject detection unit 54 detects an image of the finger from the data of the captured image and an image of a shadow of the finger, and acquires a distance between the tip of the finger and the screen SC based on the distance between the detected images.

In addition, in a case where a plural person areas are detected from the data of the captured image, the subject detection unit 54 detects an area of the second indicator 80 and the coordinates of the indication position of the second indicator 80 for each person area, and calculates the distance between the detected second indicator 80 and the screen SC.

The subject detection unit 54 detects coordinates of an indication position of the first indicator 70. The subject detection unit 54 detects an image of infrared light, which is photographed in the data of the captured image that is captured by the image capturing unit 51 using infrared light, and detects the coordinates of the indication position of the first indicator 70 in the data of the captured image. A method of specifying the first indicator 70 from the data of the captured image by the image capturing unit 51 will be described in detail later.

In addition, the subject detection unit 54 determines whether or not a tip section 71 of the first indicator 70 is in contact with the screen SC, and generates touch information which shows whether or not the tip section 71 is in contact with the screen SC. A method of determining whether or not the tip section 71 of the first indicator 70 is in contact with the screen SC will be described later.

In addition, in a case where plural first indicators 70 are used, the subject detection unit 54 distinguishes between the respective images of infrared light emitted from the plural first indicators 70 as images of different first indicators 70. A method of distinguishing between the images of pieces of infrared light emitted from the plural first indicators 70 by the subject detection unit 54 will be described later. The coordinate calculation unit 55 gives pieces of identification information, which identify the respective first indicators 70, to the coordinates of the indication positions indicated by the respective first indicators 70, and outputs the pieces of identification information to the control unit 30.

The coordinate calculation unit 55 converts the coordinates of the indication positions into the coordinates of the indication positions in the display image of the screen SC. The coordinates of the indication positions of the first indicators 70 and the second indicator 80, which are detected by the subject detection unit 54, are coordinates in the data of the captured image. The coordinate calculation unit 55 calculates the coordinates of the indication positions on axes of coordinates, which are virtually provided on the display image of the screen SC, from the coordinates of the indication positions detected by the subject detection unit 54 based on a result of calibration. The coordinates in the data of the captured image are influenced by various factors such as a distance between the projector 100 and the screen SC, a zoom rate in the optical projection system 23, an installation angle of the projector 100, and a distance between the image capturing unit 51 and the screen SC. The coordinate calculation unit 55 calculates the coordinates of the indication positions in the display image of the screen SC from the coordinates of the indication positions in the data of the captured image based on the result of calibration which is performed in advance. In a case where calibration is performed, a prescribed pattern image is projected onto the screen SC from the projection unit 20, and the displayed pattern image is captured by the image capturing unit 51. Correspondence (coordinate conversion parameter) between the coordinates in the data of the captured image and coordinates on the display image of the screen SC is led based on the pattern image captured by the image capturing unit 51.

The coordinate calculation unit 55 outputs the coordinates of the indication position, which is indicated by the second indicator 80, indicator information, distance information, person area range information, and the data of the captured image to the control unit 30. The indicator information is information which shows that the coordinates of the indication position are coordinates indicated by the second indicator 80. The distance information is information which shows a distance between the second indicator 80 and the screen SC. The person area range information is range information which is used to calculate the coordinates of the indication position by the subject detection unit 54.

In addition, the coordinate calculation unit 55 outputs the coordinates of the indication position, which is indicated by the first indicator 70, the indicator information, the touch information, and the identification information to the control unit 30. The indicator information is information which shows that the coordinates of the indication position are coordinates indicated by the first indicator 70. The touch information is information which shows whether or not the tip section 71 of the first indicator 70 is in contact with the screen SC. The identification information is information which identifies the respective first indicators 70 in a case where the plural first indicators 70 are used. The coordinate calculation unit 55 adds the identification information to the coordinates of the indication position, the indicator information, and the touch information and outputs the pieces of information to the control unit 30 even in a case where only one first indicator 70 is used.

The first indicator 70 includes a control unit 73, a transmission and reception unit 74, an operation switch 75, and a power supply unit 76, and the respective units are accommodated in a shaft unit 72 (see FIG. 1). The control unit 73 is connected to the transmission and reception unit 74 and the operation switch 75, and detects an on/off state of the operation switch 75. The transmission and reception unit 74 includes a light source, such as an infrared LED, and a light-receiving element which receives infrared light. The transmission and reception unit 74 lights up and lights off the light source according to the control of the control unit 73, and outputs a signal which shows a light-receiving state of the light-receiving element to the control unit 73.

The power supply unit 76 includes a dry battery or a secondary battery as a power source, and supplies electricity to the respective units which include the control unit 73, the transmission and reception unit 74, and the operation switch 75. The first indicator 70 may include a power source switch which turns on/off the power source supply from the power supply unit 76.

Here, a method of specifying the indication position of the first indicator 70 from the data of the captured image by the image capturing unit 51 using mutual communication between the position detection unit 50 and the first indicator 70 will be described.

In a case where an operation is detected by the first indicator 70, the control unit 30 controls the image capturing control unit 53 and transmits a synchronization signal from the transmission unit 52. That is, the image capturing control unit 53 lights up the light source of the transmission unit 52 on a prescribed period under the control of the control unit 30. Infrared light, which is periodically emitted by the transmission unit 52, functions as a synchronization signal which synchronizes the position detection unit 50 with the first indicator 70.

In contrast, after supply of power from the power supply unit 76 starts and a prescribed initializing behavior is performed, the control unit 73 receives infrared light, which is emitted by the transmission unit 52 of the projector 100, using the transmission and reception unit 74. In a case where infrared light, which is periodically emitted by the transmission unit 52, is received using the transmission and reception unit 74, the control unit 73 causes the preset first indicator 70 to light up (emits light) the light source of the transmission and reception unit 74 with a unique lighting-up pattern in synchronization with an infrared light timing. In addition, the control unit 73 switches over the lighting-up pattern of the transmission and reception unit 74 according to the operation state of the operation switch 75. Therefore, it is possible for the subject detection unit 54 of the projector 100 to determine an operation state of the first indicator 70, that is, whether or not the tip section 71 is pushed onto the screen SC based on data of the plural captured images.

In addition, the control unit 73 performs the pattern repeatedly while power is supplied from the power supply unit 76. That is, the transmission unit 52 periodically transmits the infrared signal for synchronization to the first indicator 70, and the first indicator 70 transmits the preset infrared signal in synchronization with the infrared signal which is transmitted by the transmission unit 52.

The image capturing control unit 53 performs control such that image capturing timing by the image capturing unit 51 matches timing in which the first indicator 70 lights up. The image capturing timing is determined based on timing in which the image capturing control unit 53 lights up the transmission unit 52. It is possible for the subject detection unit 54 to specify a lighting-up pattern of the first indicator 70 based on whether or not an image of light of the first indicator 70 is photographed in the data of the captured image of the image capturing unit 51. The subject detection unit 54 determines whether or not the tip section 71 of the first indicator 70 is pushed onto the screen SC based on the data of the plural captured images, and generates the touch information.

It is possible to cause the lighting-up pattern of the first indicator 70 to include a unique pattern for each individual first indicator 70, a common pattern of plural first indicators 70, and a unique pattern for each individual first indicator 70. Here, in a case where the data of the captured image includes the images of pieces of infrared light emitted from the plural first indicators 70, it is possible for the subject detection unit 54 to distinguish between respective images as images of different first indicators 70.

The control unit 30 realizes functions of a projection control unit 31, a person detection unit 32, a detection unit 33, an invalid determination unit 34, and a detection control unit 35 by reading and executing the control program 61 stored in the storage unit 60, and controls each of the units of the projector 100.

The projection control unit 31 acquires content of an operation, which is performed in such a way that the operator operates the remote controller, based on the operation data which is input from the operation detection unit 17. The projection control unit 31 controls the image processing unit 40, the light source driving unit 45, and the optical modulation device driving unit 46 according to the operation performed by the operator, and projects an image on the screen SC.

In addition, the projection control unit 31 controls the image processing unit 40, and performs the above-described process that distinguishes between a 3D (solid) image and a 2D (plane) image, the resolution conversion process, the frame rate conversion process, the distortion correction process, the digital zoom process, the color tone correction process, the brightness correction process, and the like. In addition, the projection control unit 31 controls the light source driving unit 45 in accordance with a process of the image processing unit 40, and controls the quantity of light of the light source unit 21.

The person detection unit 32 detects an area, which is close to a predetermined shape or feature of a face, from the person area of the captured image, as a facial area based on the data of the captured image and the person area range information which are input from the position detection unit 50. The person detection unit 32 calculates a feature amount from the detected facial area. Here, the feature amount is a unique value of a person which is photographed in the captured image. The person detection unit 32 measures and digitizes, for example, a size of the facial area of the person, a ratio of the facial area of the person in the captured image, an interval between eyes and eyebrows, an interval between both eyes, a length in a vertical direction and a width in a horizontal direction of an eye, and the like, using a preset condition, and acquires the feature amount. In addition, the person detection unit 32 may measure and digitize a length in a vertical direction and a width in a horizontal direction of a nose, a width in a horizontal direction of a mouth, an interval between eyes and a nose, an interval between a nose and a mouth, existence/non-existence of glasses, and the like using the preset condition, and may acquire the feature amount.

In addition, the person detection unit 32 sets an area excluding the facial area from the person area of the captured image as a human body area, and calculates the feature amount from the human body area. The person detection unit 32 recognizes a part of body of the operator, for example, a shoulder, hands, foots, and the like from the human body area, measures and digitizes, for example, a length of a leg, a length of an arm, a height, a body type, and the like using the preset condition, and acquires the feature amount. In addition, the person detection unit 32 may detect colors of clothes and a color of hair from the data of the person area of the captured image, and may use the detected colors as the feature amount.

In addition, the person detection unit 32 calculates positional information, which shows a position of the operator, based on the data of the captured image and the person area range information in the captured image. For example, the person detection unit 32 calculates central coordinates of the person area in the horizontal direction of the captured image, and sets the calculated central coordinates as the positional information in the horizontal direction of the operator.

In addition, in the data of the captured image, the screen SC and the operator who exists in the image capturing range are photographed. The person detection unit 32 detects the person area and the screen SC from the data of the captured image, and calculates a distance between the central coordinates of the person area and the screen in the vertical direction of the captured image. The person detection unit 32 sets a distance from the screen SC to the central coordinates of the person area as the positional information of the operator in the vertical direction.

In addition, in a case where plural people are photographed in the captured image and plural pieces of person area range information are input from the position detection unit 50, the person detection unit 32 specifies positions of operators for the respective person areas.

FIG. 3 illustrates an operation history table 62. In the operation history table 62, operation history information is registered. The operation history information includes an operator ID, positional information, a person area range, a feature amount, operation information, trace data, date and time information, and the like.

The operator ID is an ID which identifies an operator. In a case where the person detection unit 32 detects a new operator (positional information and feature amount) from a captured image, the person detection unit 32 gives an operator ID to the detected operator and registers the operator ID in the operation history table 62, together with the positional information, the person area range, and the feature amount. The new operator is an operator, in which feature amount is different from feature amounts of operators who are completely registered in the operation history table 62. The operation information, the trace data, and the date and time information are generated by the detection unit 33 which will be described later, and are pieces of information which are registered in the operation history table 62 by the detection unit 33. These pieces of information will be described in detail later.

The person detection unit 32 compares a feature amount of the operator detected from a current captured image with a feature amount of each operator registered in the operation history table 62, and determines whether or not the detected operator is an operator who is completely detected.

In a case where a feature amount, which matches a feature amount of the operator detected from the current capture image (hereinafter, referred to as a subject operator), is registered in the operation history table 62, the person detection unit 32 determines that the subject operator is an operator who is completely detected. In this case, the person detection unit 32 reads positional information of the operator who has a matching feature amount from the operation history table 62, and compares the read positional information with the positional information detected from the current captured image. The person detection unit 32 determines whether or not the subject operator is moving from a position detected from a previous captured image. In a case where the positional information is updated, the person detection unit 32 registers and updates the positional information and the person area range information, which are detected from the current captured image, in relevant cells in the operation history table 62.

In addition, in a case where the feature amount, which matches the feature amount of the subject operator, is not registered in the operation history table 62, the person detection unit 32 determines that the subject operator is a newly detected operator.

The person detection unit 32 gives a new ID number (referred to as an operator ID) to the subject operator, and registers the positional information, the person area range information, and the feature amount in the operation history table 62.

The detection unit 33 includes a memory (not shown in the drawing), and detects an operation performed on an operation surface by the first indicator 70 and an operation performed on the operation surface by the second indicator 80. The operation includes an operation that designates (indicates) a fixed position on the screen SC, an operation that consecutively indicates different positions on the screen SC, a gesture operation, and the like.

The invalid determination unit 34 includes a first mode and a second mode as a processing mode. In a case where the first mode is set, the invalid determination unit 34 performs a first process. In addition, in a case where the second mode is set, the invalid determination unit 34 performs a second process. The invalid determination unit 34 performs the first mode and the second mode by switching between the first mode and the second mode. That is, the first process and the second process are not simultaneously performed. In a case where an indication (hereinafter, referred to as an invalid indication) which causes an already input operation to be invalid is detected by the detection unit 33, the invalid determination unit 34 determines an operation to be invalid according to the processing mode, and causes the determined operation to be invalid.

In addition, for example, in a case where a gesture, which shakes a finger of an operator as the second indicator 80 from the left to the right or from the right to the left one or more times, is detected, the detection unit 33 determines the detected gesture as the invalid indication. Meanwhile, for example, in a case where an operation that draws a preset symbol, such as an x mark, on the screen SC using the first indicator is detected, the detection unit 33 may determine the operation as the invalid indication.

In a case where the invalid indication is detected by the detection unit 33, the invalid determination unit 34 refers to the operation history information of the operator who performs the invalid indication.

The invalid determination unit 34 determines whether or not operations are detected in order of an operation (first operation) performed by the second indicator 80, an operation performed by the first indicator 70, and an operation (second operation) which shows the invalid indication as the operation history information of the operator who performs the invalid indication. In a case where operations are detected in the above-described order, the invalid determination unit 34 determines whether the processing mode is the first mode or the second mode, and changes a process as below according to whether the processing mode is the first mode or the second mode. First, in the case where operations are detected in the above-described order in the first mode, the invalid determination unit 34 causes the operation performed by the second indicator 80 to be invalid as the first process. Subsequently, in the case where operations are detected in the above-described order and the processing mode is the second mode, the invalid determination unit 34 causes the operation performed by the first indicator 70 to be invalid as the second process.

In addition, even in a case where an operation performed by another operator is detected while the operation performed by the second indicator 80 and the operation performed by the first indicator 70 are detected, the invalid determination unit 34 may cause the operation performed by the second indicator 80 to be invalid in the first process. In addition, the invalid determination unit 34 may cause the operation performed by the first indicator 70 to be invalid in the second process. In addition, even in a case where an operation performed by another operator is detected while the operation performed by the first indicator 70 and an operation which shows the invalid indication are detected, the invalid determination unit 34 may cause the operation performed by the second indicator 80 to be invalid in the first process. In addition, the invalid determination unit 34 may cause the operation performed by the first indicator 70 to be invalid in the second process. Specifically, in a case where operations are detected in order of the operation performed by the second indicator 80 (first operation), the operation performed by the first indicator 70, and the operation which shows the invalid indication (second operation) as the operation history information, the control unit 30 may cause the first operation to be invalid if it is determined that the operator of the second operation is the same as the operator of the first operation from the operation history information, and the control unit 30 may not cause the first operation to be invalid if it is determined that the operator of the second operation is not the same as the operator of the first operation.

The detection control unit 35 controls the position detection unit 50 to detect the indication positions by the first indicator 70 and second indicator 80.

In addition, the detection control unit 35 performs a preset process based on a command or the like which is input from the invalid determination unit 34. For example, the detection control unit 35 performs a process of causing the image processing unit 40 to draw a figure based on a drawing command which is input from the invalid determination unit 34 and coordinates which designate a drawing position, and performing projection after overlapping the drawn figure with an input image which is input to the image I/F unit 12. In addition, the detection control unit 35 may output the acquired coordinates to an external device, such as a PC, which is connected to the I/F unit 11. In this case, the detection control unit 35 may convert the acquired coordinates into a data format which is recognized as an input of the coordinates input device in an operating system of the external device which is connected to the I/F unit 11, and may output the data format. For example, in a case where a PC, which behaves in a Windows (registered trademark) operating system, is connected to the I/F unit 11, data which is processed as input data of a Human Interface Device (HID) in the operating system is output. In addition, the detection control unit 35 may output data, which identifies the indication position of the first indicator 70 or the indication position of the second indicator 80, and data which shows an operation state of the operation switch 75, together with coordinate data.

Figure 4:
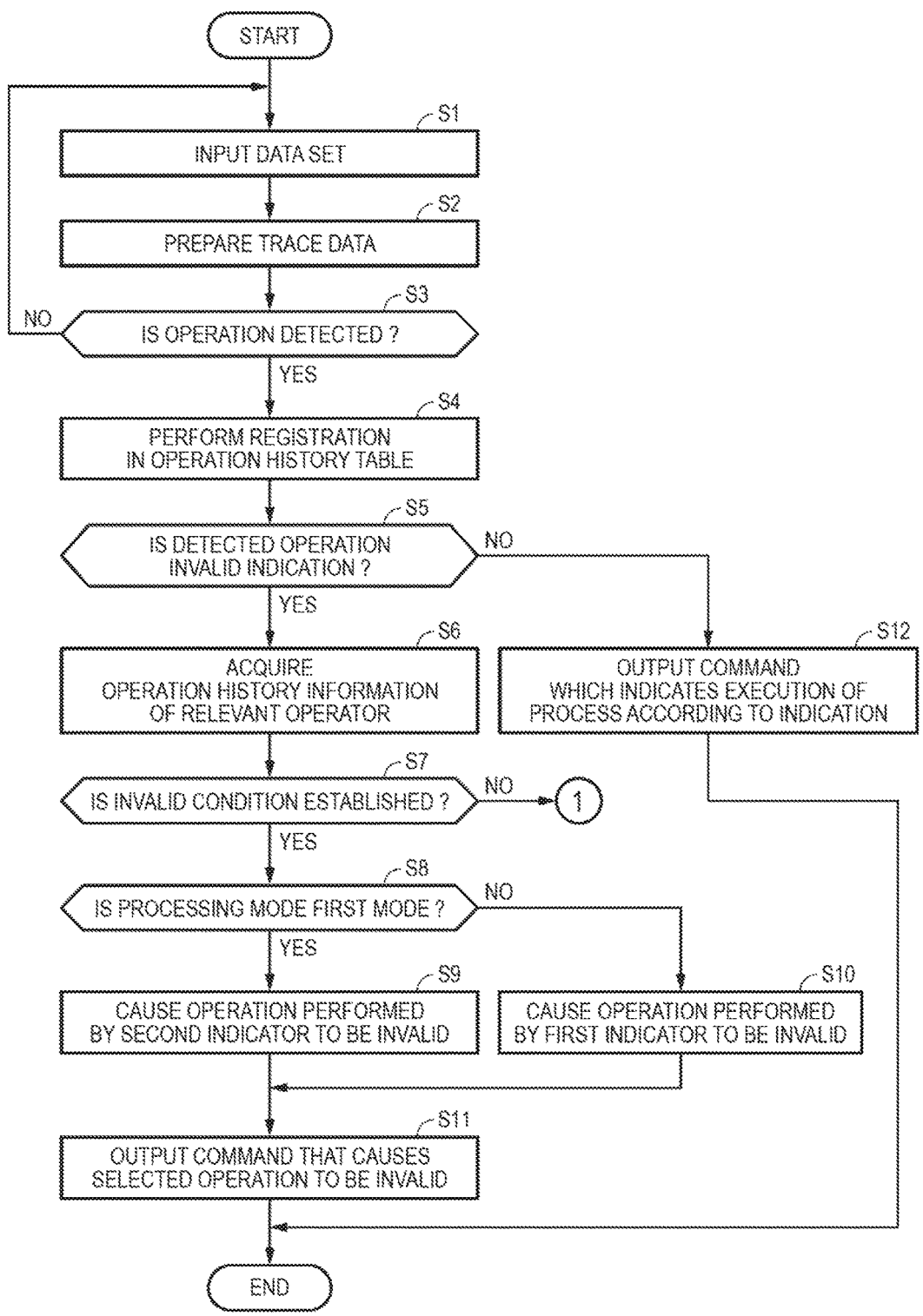
FIG. 4 is a flowchart illustrating a processing procedure of a control unit.
Figure 5:
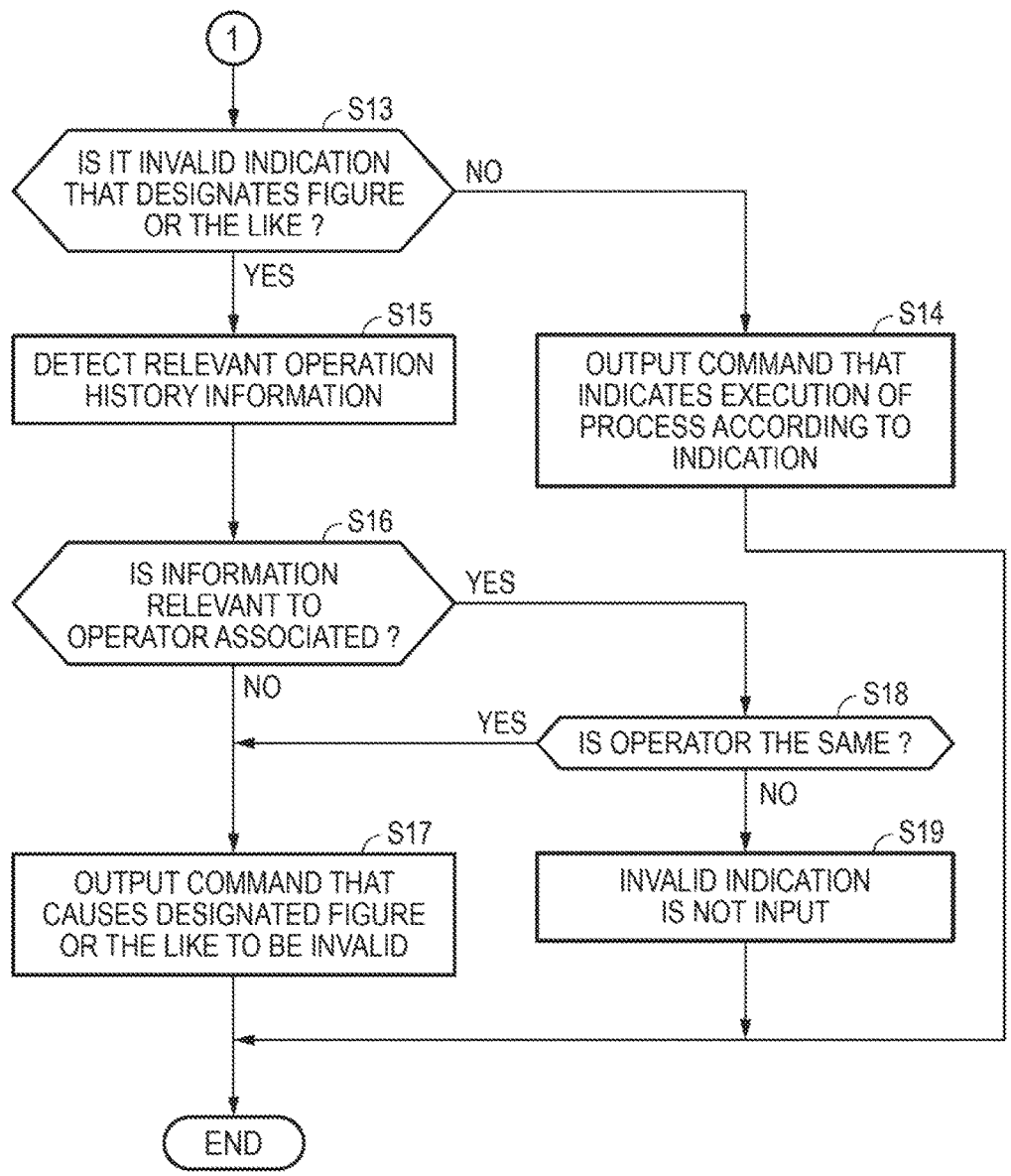
FIG. 5 is a flowchart illustrating the processing procedure of the control unit.

FIGS. 4 and 5 are flowcharts illustrating processing procedures of the detection unit 33 and the invalid determination unit 34.

First, the detection unit 33 inputs data set from the position detection unit 50 and the person detection unit 32 (step S1). The data set includes a first data set and a second data set. The first data set is data which is input to the detection unit 33 in a case where the coordinates of the indication position detected by the position detection unit 50 are the coordinates of the indication position of the first indicator 70. The first data set includes the coordinates of the indication position, the indicator information, the touch information, and the identification information. In addition, the second data set is data which is input to the detection unit 33 in a case where the coordinates of the indication position detected by the position detection unit 50 are the coordinates of the indication position of the second indicator 80. The second data set includes the coordinates of the indication position, the indicator information, the distance information, and the person area range information which are input from the position detection unit 50, the positional information of the operator which is input from the person detection unit 32, and the person area range information. The detection unit 33 associates the coordinates of the indication position with the positional information of the operator based on the person area range information, which is input from the position detection unit 50, and the person area range information which is input from the person detection unit 32. That is, the detection unit 33 associates the coordinates of the indication position of the same person area range information with the positional information of the operator.

Subsequently, the detection unit 33 stores the data set, which is input from the position detection unit 50, in the memory, and prepares trace data which shows a trace of the indication position according to at least anyone of the first indicator 70 and the second indicator 80 (step S2).

In a case where the input data set is the first data set, the detection unit 33 first determines whether or not the first indicator 70 is in contact with the screen SC according to the touch information. In a case where it is determined that the first indicator 70 is not in contact with the screen SC according to the touch information, the detection unit 33 considers currently input first data set as invalid data, and does not store the first data set in the memory.

Subsequently, the detection unit 33 determines whether or not the coordinates of the indication position associated with the same identification information as identification information of the currently input first data set are already stored in the memory with reference to the identification information included in the first data set. In a case where the coordinates of the indication position associated with the same identification information is stored in the memory, the detection unit 33 stores the coordinates of the indication position of the currently input first data set in the memory in association with the coordinates of the indication position which is stored in the memory. That is, the detection unit 33 stores the coordinates of the indication position which is indicated by the same first indicator 70 in association with the memory.

In addition, in a case where the coordinates of the indication position, which is associated with the same identification information as the identification information of the currently input first data set, are not stored in the memory, the detection unit 33 stores the coordinates of the indication position of the currently input first data set while not associating with coordinates of another indication position.

In addition, in a case where the input data set is the second data set, the detection unit 33 first refers to distance information included in the second data set. The detection unit 33 determines one of two groups below, to which the currently input second data set belongs, based on the distance information. A first group is a group which indicates an indication position by the second indicator 80 which is in contact with the screen SC. A second group is a group in which the second indicator 80 is not in contact with the screen SC and the distance between the second indicator 80 and the screen SC is included in a preset distance.

The detection unit 33 determines whether or not the same position as the position of the operator shown by the positional information included in the currently input second data set or the coordinates of the indication position associated with positional information in a preset distance from the position of the operator shown by the positional information are stored in the memory. That is, the detection unit 33 determines whether or not the coordinates of the indication position, which is indicated in the past by the operator who indicates the coordinates of the currently input indication position, are stored in the memory based on the positional information of the operator. Meanwhile, the coordinates of the indication position which is a subject are the coordinates of the indication position indicated by the second indicator 80.

In a case where the detection unit 33 determines that the coordinates of the indication position, which is input by the same operator, is stored in the memory, the detection unit 33 determines whether or not the coordinates of the indication position of the currently input second data set and the coordinates of the indication position, which are completely stored in the memory, belong to the same group. In a case where the detection unit 33 determines that the coordinates of the indication positions belong to the same group, the detection unit 33 stores the coordinates of the indication position of the currently input second data set in the memory in association with the completely stored coordinates of the indication position. In addition, in a case where the detection unit 33 determines that the coordinates of the indication positions do not belong to the same group, the detection unit 33 stores the coordinates of the indication position of the currently input second data set without associating with coordinates of another indication position which is completely stored in the memory. That is, even in a case of the coordinates of the indication position which is indicated by the same operator, the detection unit 33 separately stores the indication position, acquired in a case where the second indicator 80 is in contact with the screen SC, and the indication position, acquired in a case where the second indicator 80 is not in contact with the screen SC, in the memory.

Subsequently, the detection unit 33 detects an operation performed by at least anyone of the first indicator 70 and the second indicator 80 based on the prepared trace data of the indication position (step S3). The operation performed by the first indicator 70 or the second indicator 80, which is detected by the detection unit 33, includes, for example, an operation that draws a figure in the indication position or disposes a letter or a symbol, an operation that draws a figure along the trace data of the indication position, an operation that removes the drawn figure, the letter, or the symbol, and the like. The detection unit 33 detects, for example, the operation that draws a figure or the like using the trace data which is prepared based on the coordinates of the indication position of the first indicator 70. In addition, the detection unit 33 detects, for example, the operation that performs drawing or disposes a letter, a symbol, or the like using the coordinates of the indication position classified as the first group, that is, the trace data which is prepared based on the coordinates of the indication position of the second indicator 80 that is in contact with the screen SC.

In addition, the operation performed by the second indicator 80, which is detected by the detection unit 33, includes a gesture. The gesture includes, for example, an operation that enlarges or reduces a display image of the screen SC, an operation that causes an input operation to be invalid once, and the like. The detection unit 33 detects a gesture performed by the second indicator 80 using the coordinates of the indication position which are classified as the second group, that is, the trace data which is prepared from the coordinates of the indication position of the second indicator 80 that is not in contact with the screen SC.

The detection unit 33 detects a gesture by comparing the trace data of the indication position of the second indicator 80 with a gesture behavior pattern which is registered in a gesture pattern dictionary of the storage unit 60. The detection unit 33 extracts a behavior feature (for example, motion belt) of the second indicator 80 from the trace data of the indication position of the second indicator 80. Furthermore, the detection unit 33 detects the gesture by comparing the extracted behavior feature of the second indicator 80 with the gesture behavior pattern which is registered in the gesture pattern dictionary.

In a case where it is difficult to detect operations performed by the first indicator 70 and the second indicator 80 (step S3/NO), the detection unit 33 returns to the process of step S1. In addition, in a case where the operation performed by the first indicator 70 is detected (step S3/YES), the detection unit 33 registers the operation information, which shows content of the detected operation, and the trace data, which is used to detect the operation, in the operation history table 62 (step S4). In addition, in a case where the operation performed by the second indicator 80 is detected (step S3/YES), the detection unit 33 registers the operation information, which shows content of the detected operation, and the trace data, which is used to detect the operation in the operation history table 62 (step S4). Here, the detection unit 33 determines an operator ID which is associated with the operation information and the trace data with reference to the person area range information which is registered in the operation history table 62. For example, the detection unit 33 determines the operator ID which associates the operation information with the trace data based on a person area, in which coordinates shown by the trace data are included, or a person area to which the coordinates are the closest. The operation information includes indicator information which shows the operation performed by the first indicator 70 or the operation performed by the second indicator 80. In addition, the detection unit 33 registers date and time, in which the operation information and the trace data are registered in the operation history table 62, in the operation history table 62 as the date and time information.

In addition, in a case where a gesture is detected as the operation of the second indicator 80, the detection unit 33 registers operation information, which shows content of the gesture, and trace data in the operation history table 62. Here, the detection unit 33 determines the operator ID which associates the operation information with the trace data based on a person area, in which coordinates shown by the trace data are included, or a person area to which the coordinates are the closest. In addition, the detection unit 33 registers date and time, in which the operation information and the trace data are registered, in the operation history table 62 as the date and time information.

In addition, in a case where preset time elapses after the operation information, the trace data, and the date and time information are registered in the operation history table 62, the detection unit 33 deletes information relevant to the operator, which is associated with the pieces of information, from the operation history table 62. The information relevant to the operator includes the operator ID, the positional information, the person area, and the feature amount information.

Subsequently, the detection unit 33 determines whether or not the invalid indication is detected based on the trace data (step S5). In a case where it is determined that the detected operation is not invalid (step S5/NO), the detection unit 33 outputs a command, which indicates to perform a process according to the detected operation, to the detection control unit 35 (step S12). In addition, in a case where the detected operation is the invalid indication (step S5/YES), the detection unit 33 notifies a fact that the invalid indication is detected and an operator ID of the operator who detects the operation to the invalid determination unit 34.

In a case where a notification of the fact that the invalid indication is detected is input from the detection unit 33, the invalid determination unit 34 acquires operation history information of the operator shown by the operator ID, which is input together with the notification, from the operation history table 62 (step S6). The invalid determination unit 34 acquires operation history information, which is input one before the invalid indication, and operation history information, which is input two before the last invalid indication, in the operation history information of the operator shown by the operator ID.

Subsequently, the invalid determination unit 34 determines whether or not an invalid condition is established based on the acquired operation history information (step S7). In a case where operations are detected in order of the operation performed by the second indicator 80, the operation performed by the first indicator 70, and the invalid indication and the operations are input by the same operator, the invalid determination unit 34 determines that the invalid condition is established. In a case where the determination in step S7 is positive determination (step S7/YES), the invalid determination unit 34 determines whether or not a current processing mode is the first mode (step S8). In a case of the positive determination (step S8/YES), the invalid determination unit 34 selects an operation that causes the operation performed by the second indicator 80 to be invalid (step S9). In the first mode, it is determined that there is a high possibility that the operation performed by the first indicator 70 is correct in the operation performed by the first indicator 70 such as a pen and the operation performed by the second indicator 80, such as a finger of the operator, and thus the operation that causes the operation performed by the second indicator 80 to be invalid is selected. For example, in a case where a motion of a finger of the operator, which is the second indicator 80, is erroneously detected and the operator inputs the operation performed by the first indicator 70 without being aware of input of the operation performed by the second indicator 80, it is possible to cause the operation of the second indicator 80 to be invalid by an invalid indication. In addition, in a case where the motion of the finger of the operator is erroneously detected includes, for example, a case where a finger is in contact with the screen SC while the operator is not aware of it, and a case where a gesture performed during conversation with another operator is erroneously detected as an operation performed on the screen SC.

FIG. 6 is an explanatory view illustrating a behavior of the projector 100 in a case where an indication is provided. FIGS. 6(A) to 6(E) illustrate display states of the screen SC in a case where an indication is performed. The projector 100 transitions the display state of the screen SC according to arrows illustrated in FIG. 6 according to the operations performed by the first indicator 70 and the second indicator 80 and the invalid indication.

FIG. 6 illustrates the screen SC and letters drawn on the screen SC. FIG. 6(A) illustrates a state in which letters, that is, "patent 12345", "patent 67890", and "patent ABCDE" are drawn in three lines on the screen SC. FIG. 6(B) illustrates a state in which letters "patent 12345" in the first line are deleted from the state illustrated in FIG. 6(A). It is assumed that the letters "patent 12345" are erroneously deleted by the operation performed by the second indicator 80. For example, a case is exemplified in which the projector 100 erroneously detects a gesture performed during conversation with another operator as the operation performed on the screen SC. FIG. 6(C) illustrates a state in which the operator inputs letters "patent EFGHIJ" under the letters "patent ABCDE" without being aware of an erroneous operation performed by the second indicator 80 and thus the letters "patent EFGHIJ" are drawn on the screen SC. In a case where, after the letters "patent EFGHIJ" are input, the operator is aware that the letters "patent 12345" drawn in the first line are erroneously deleted and performs an undo operation that causes an operation performed immediately before to be invalid, the letters "patent EFGHIJ" are removed. FIG. 6(D) illustrates a state in which the letters "patent EFGHIJ" are removed from the display of the screen SC by the undo operation.

Figure 6A:
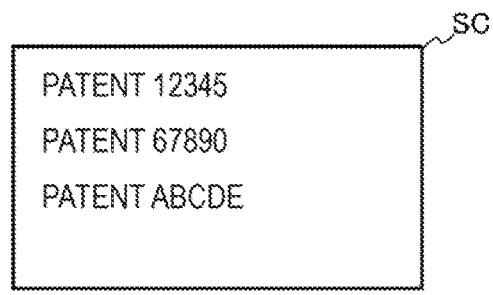
FIG. 6 is an explanatory view illustrating a behavior of the projector in a case where an indication is provided.
Figure 6B:
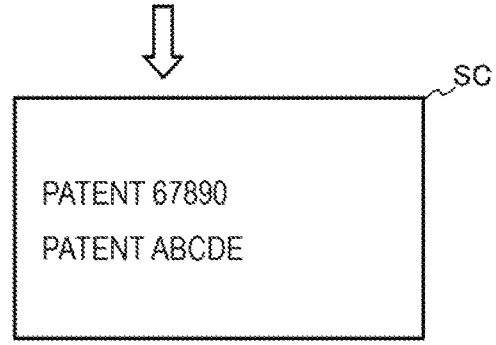
Figure 6C:
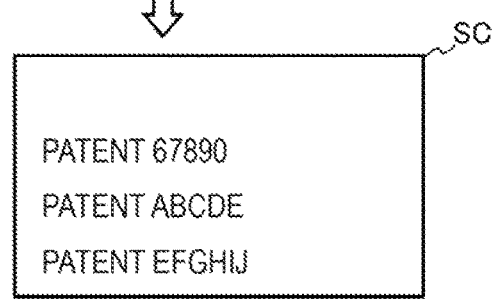
Figure 6D:
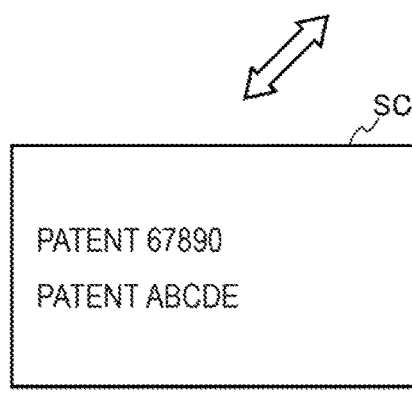
Figure 6E:
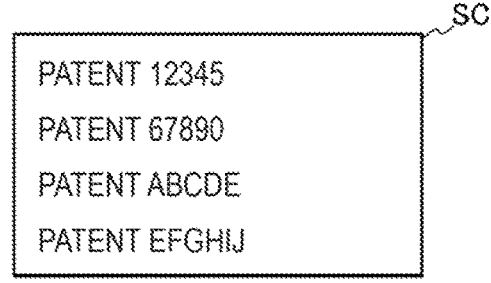

FIG. 6(E) illustrates a display state of the screen SC in a case where, after the letters "patent EFGHIJ" are input under the letters "patent ABCDE" without being aware of the erroneous operation illustrated in FIG. 6(C), the invalid indication in the first mode according to the embodiment is input to the projector 100.

In a case where the operation that deletes the letters "patent 12345" by the second indicator 80 is detected, the operation that inputs the letters "patent EFGHIJ" by the first indicator 70 is detected, and the invalid indication is received, the invalid determination unit 34 determines that the case corresponds to an invalid condition. In this case, the invalid determination unit 34 selects the operation that deletes the letters "patent 12345", which is the operation performed by the second indicator 80, as a subject to be invalid.

In addition, in a case where the determination of step S8 is negative determination (step S8/NO), the invalid determination unit 34 determines that the processing mode is the second mode and selects the operation performed by the first indicator 70 as an operation to be invalid (step S10). In a case where the invalid determination unit 34 selects the operation to be invalid, the invalid determination unit 34 outputs a command which causes the selected operation to be invalid (step S11). For example, in a case where the operation to be invalid is an operation that removes a figure drawn on the screen SC, the invalid determination unit 34 outputs the drawing command which draws the removed figure and coordinates information that shows a drawing position of the figure to the detection control unit 35. The detection control unit 35 indicates the image processing unit 40 to draw the figure according to an indication of the invalid determination unit 34. The image processing unit 40 superimposes the indicated figure on the image data deployed in the frame memory 41. In addition, in a case where the operation to be invalid is the operation that draws a figure on the screen SC, the invalid determination unit 34 outputs a removal command which removes the drawn figure and positional information that shows a position of the figure to be removed to the detection control unit 35. The detection control unit 35 indicates the image processing unit 40 to remove the figure according to the indication of the invalid determination unit 34. The image processing unit 40 removes the figure which is superimposed on the indication position of the image data deployed in the frame memory 41 according to the indication of the detection control unit 35.

In addition, in a case where the determination of step S7 is negative determination (step S7/NO), the invalid determination unit 34 determines whether or not the detected operation (third operation) is an invalid indication that designates the figure, the letters, or the symbol (hereinafter, referred to as a figure or the like) drawn on the screen SC (step S13). For example, in a case where an operation that draws a preset symbol, such as an x mark, on the figure drawn on the screen SC is detected, the invalid determination unit 34 determines the invalid indication that designates the figure or the like. In a case where it is determined to be the invalid indication that designates the figure or the like (step S13/YES), the invalid determination unit 34 refers to trace data of the operation history table 62. The invalid determination unit 34 refers to the trace data of the operation history table 62, and detects operation history information, in which a drawing position of the figure or the like designated by a removal indication is included in the trace data, as relevant operation history information (step S15). The relevant operation history information is information of an operation that draws the figure or the like to be invalid by, that is, the invalid indication. Subsequently, the invalid determination unit 34 refers to the operation history table 62, and determines whether or not the information relevant to the operator is associated with the operation history information (step S16). In a case in which the information relevant to the operator is not associated (step S16/NO), the invalid determination unit 34 outputs a command which causes the designated figure or the like to be invalid and the positional information that shows a position of the figure to be invalid to the detection control unit 35 (step S17). The case where the information relevant to the operator is not associated includes a case where, for example, preset time elapses after the operation information, the trace data, and the date and time information are registered in the operation history table 62, and the information relevant to the operator associated with the pieces information is deleted from the operation history table 62, and the like. The detection control unit 35 outputs an indication that causes the figure or the like to be invalid to the image processing unit 40 according to the indication of the invalid determination unit 34. The image processing unit 40 removes the figure or the like, which is superimposed on the indication position of the image data deployed in the frame memory 41, according to the indication of the detection control unit 35.

In addition, in a case where the information relevant to the operator is associated (step S16/YES), the invalid determination unit 34 determines whether or not the operator who performs the operation that detects the operation history information in step S15 is the same as the operator of the invalid indication in step S13 (step S18). In a case where the operators are not the same (step S18/NO), the invalid determination unit 34 does not input the invalid indication (step S19). That is, the figure or the like, which is designated by the invalid indication, maintains a state of being displayed on the screen SC. In addition, in a case where the operators are the same (step S18/YES), the invalid determination unit 34 outputs the command, which causes the figure or the like to be invalid and the positional information that shows the position of the figure to be removed, to the detection control unit 35 (step S17). In addition, in a case where the indication in step S13 is not the invalid indication that designates the figure or the like (step S13/NO), the invalid determination unit 34 outputs a command which indicates to perform a process according to the operation to the detection control unit 35 (step S14).

Meanwhile, in a case where it is determined that the first indicator 70 is in contact with the screen SC based on the touch information in the above-described step S2, the detection unit 33 may detect the coordinates of the indication position included in the input first data set as an operation. In this case, the detection unit 33 may give the drawing command to the coordinates of the indication position, and may output resulting coordinates to the detection control unit 35. The detection control unit 35 causes the image processing unit 40 to draw a letter and a figure in the indication position of the image data deployed in the frame memory 41 based on the coordinates of the indication position. In addition, the same manner is applied to coordinates of the indication position which belongs to the first group in the coordinates of the indication position of the second indicator 80.

As described above, the projector 100 according to the embodiment includes the detection unit 33 and the invalid determination unit 34. The detection unit 33 detects the operation performed on the screen SC by the first indicator 70 and the operation performed on the screen SC by the second indicator 80. The invalid determination unit 34 receives an indication that causes an operation to be invalid. In a case where the detection unit 33 receives an indication after detecting the operation performed by the second indicator 80 and, thereafter, detecting the operation performed by the first indicator 70, the invalid determination unit 34 causes the operation performed by the second indicator 80 to be invalid. Accordingly, it is possible to improve operability in a case where operations are performed by plural indicators (first indicator 70 and the second indicator 80).

In addition, the invalid determination unit 34 performs the first process and the second process by switching between the first process and the second process. The first process is a process that causes the operation performed by the second indicator 80 to be invalid in a case where the detection unit 33 detects the operation performed by the second indicator 80, thereafter, detects the operation performed by the first indicator 70, and receives an indication. In addition, the second process is a process that causes the operation performed by the first indicator 70 to be invalid in a case where the detection unit 33 detects the operation performed by the second indicator 80, thereafter, detects the operation performed by the first indicator 70, and receives an indication. Accordingly, it is possible to select an operation of an indicator (the first indicator 70 or the second indicator 80) to be invalid.

In addition, the detection unit 33 detects the operation performed by the first indicator 70 in association with the operator who operates the first indicator 70, and, in addition, detects the operation performed by the second indicator 80 in association with the operator who operates the second indicator 80. In a case where, after the detection unit 33 detects the first operation performed by the second indicator 80 and, thereafter, detects the operation performed by the first indicator 70, the invalid determination unit 34 detects the second operation performed by the second indicator 80, the second operation is an operation that shows an indication, and it is determined that the operator of the second operation is the same as the operator of the first operation, the invalid determination unit 34 causes the first operation to be invalid. In addition, in a case where it is determined that the operator of the second operation is not the same as the operator of the first operation, the invalid determination unit 34 does not cause the first operation to be invalid. Accordingly, in the case where the operator of the second operation is the same as the operator of the first operation, it is possible to cause the first operation performed by the second indicator 80 to be invalid. In addition, it is possible to prevent the first operation performed by the second indicator 80 from being invalid by another operator.

In addition, the invalid determination unit 34 causes the first operation to be invalid until preset time elapses after the detection unit 33 detects the first operation in the case where the operator of the second operation is the same as the operator of the first operation. In a case where the third operation, which is performed by the second indicator 80 and is detected by the detection unit 33 after the preset time elapses, is an operation that shows an indication which causes the first operation to be invalid, the invalid determination unit 34 causes the first operation to be invalid even though the operator of the third operation is not the same as the operator of the first operation. Accordingly, until the preset time elapses, it is possible to prevent the first operation from being invalid by another operator. In addition, in a case where, after the preset time elapses, if the operator is not the operator who performs the first operation, it is possible to prevent a situation in which it is difficult to cause the first operation to be invalid from occurring.

In addition, the storage unit 60 is provided that stores the operation history information in which the operation, which is performed by the second indicator 80 and is detected by the detection unit 33, is associated with an operator who performs the operation. In a case where the preset time elapses, the control unit 140 deletes information of the operator who performs the operation from the operation history information. Accordingly, it is possible to realize a process of causing the operation, performed by the second indicator 80, to be invalid by an operator other than the operator who performed the operation with a simple process.

Meanwhile, the above-described embodiment and modification example are only examples of detailed aspects to which the invention is applied, and do not limit the invention. Further, it is possible to apply the invention as to different aspects. For example, the first indicator 70 is not limited to a pen type indicator, and the second indicator 80 is not limited to a finger of the operator. For example, a laser pointer and an indication pointer, and the like may be used as the first indicator 70, and a shape and a size thereof are not limited.

In addition, although FIG. 3 illustrates the operation history table 62 in which the operation history information is registered, the operation history information may have a format in which the positional information, the feature amount, the operation information, trace data, and the date and time information are associated with the operator ID.

In addition, in the above-described embodiment, the position detection unit 50 specifies positions of the first indicator 70 and the second indicator 80 by capturing the image of the screen SC by the image capturing unit 51. However, the invention is not limited thereto. For example, the image capturing unit 51 is not limited to a unit which is provided in a main body of the projector 100 and captures an image in the projection direction of the optical projection system 23. The image capturing unit 51 may be formed as a separate body from the main body of the projector 100 and the image capturing unit 51 may capture an image from a side or a front surface of the screen SC.

In addition, in the above-described embodiment, an aspect, in which a user performs operations by the first indicator 70 and the second indicator 80 on the screen SC on which an image is projected (displayed) from the front projection-type projector 100, is described. In addition, an aspect, in which an indication operation is performed on a display screen on which display is performed by a display apparatus other than the projector 100, may be provided. It is possible to use a rear projection-type projector, a liquid crystal display, and an organic Electro Luminescence (EL) display as the display apparatus other than the projector 100. In addition, it is possible to use a plasma display, a Cathode Ray Tube (CRT) display, a Surface-conduction Electron-emitter Display (SED), and the like as the display apparatus.

In addition, in the above-described embodiment, a configuration, in which a synchronization signal is transmitted to the first indicator 70 using an infrared signal, which is emitted by the transmission unit 52, from the projector 100 to the first indicator 70, is described. However, the synchronization signal is not limited to the infrared signal. For example, a configuration, in which the synchronization signal is transmitted through radio wave communication and ultrasonic wave wireless communication, may be provided. The configuration is realized by providing the transmission unit 52 that transmits a signal through radio wave communication and ultrasonic wave wireless communication in the projector 100 and by providing a similar reception unit in the first indicator 70.

In addition, in the above-described embodiment, an example is described in which whether or not the tip section 71 of the first indicator 70 is pushed onto the screen SC is determined based on a lighting-up pattern of the transmission and reception unit 74. However, the invention is not limited thereto. For example, whether the tip section 71 of the first indicator 70 is pushed onto the screen SC may be determined by detecting an image of the first indicator 70 and an image of shadow of the first indicator 70 from the data of the captured image, similarly to the second indicator 80.

In addition, in the above-described embodiment, a configuration, in which three transmission-type liquid crystal panels corresponding to the respective RGB colors are used as the optical modulation device 22 that modulates light emitted from the light source, is described as an example. However, the invention is not limited thereto. For example, a configuration in which three reflection-type liquid crystal panels are used may be provided and a system in which one liquid crystal panel is combined with a color wheel may be used. In addition, a configuration may be provided which uses a system using three Digital Mirror Devices (DMD), a DMD system in which one digital mirror device is combined with a color wheel, and the like. In a case where only one liquid crystal panel or DMD is used as the optical modulation device, a member corresponding to the synthesis optical system, such as a cross dichroic prism, is not necessary. In addition, in addition to the liquid crystal panel and the DMD, an optical modulation device that is capable of modulating light emitted from the light source may be used without problems.

In addition, each of the functional units of the projector 100 illustrated in FIG. 2 shows a functional configuration, and a detailed embodiment thereof is not particularly limited. That is, it is not essentially necessary to mount hardware individually corresponding to each of the functional units, and it is apparently possible to provide a configuration which realizes functions of the plural functional units in such a way that one processor performs programs. In addition, in the above-described embodiment, some of functions realized by software may be realized by hardware or some of functions realized by hardware may be realized by software. In addition, it is possible to arbitrarily change detailed particular configurations of other respective units of the projector 100 without departing the gist of the invention.

The entire disclosure of Japanese Patent Application No. 2014-231010, filed Nov. 13, 2014 is expressly incorporated by reference herein.

REFERENCE SIGNS LIST

20 . . . projection unit
21 . . . light source unit
22 . . . optical modulation device
23 . . . optical projection system
30 . . . control unit
31 . . . projection control unit
32 . . . person detection unit
33 . . . detection unit
34 . . . invalid determination unit (control unit)
35 . . . detection control unit
40 . . . image processing unit
50 . . . position detection unit
51 . . . image capturing unit
52 . . . transmission unit
53 . . . image capturing control unit
54 . . . subject detection unit
55 . . . coordinate calculation unit
60 . . . storage unit
70 . . . first indicator
80 . . . second indicator
100 . . . projector (display apparatus)
SC . . . screen (operation surface)

The invention claimed is:

1. A display apparatus comprising:
a detection unit that detects an operation performed by a first indicator on an operation surface, and an operation performed by a second indicator on the operation surface; and
a control unit that receives an indication which causes the operations to be invalid,
wherein, in a case where the indication is received after the detection unit detects the operation performed by the second indicator and, thereafter, detects the operation performed by the first indicator, the control unit causes the operation performed by the second indicator to be invalid,
wherein the detection unit detects the operation performed by the first indicator in association with an operator who operates the first indicator, and detects the operation performed by the second indicator in association with an operator who operates the second indicator, and
wherein, in a case where the detection unit detects a first operation performed by the second indicator, detects the operation performed by the first indicator, detects a second operation performed by the second indicator, and the second operation is an operation that shows the indication, the control unit causes the first operation to be invalid if it is determined that an operator of the second operation is the same as an operator of the first operation, and the control unit does not cause the first operation to be invalid if it is determined that the operator of the second operation is not the same as the operator of the first operation.

2. The display apparatus according to claim 1,
wherein the control unit performs a first process and a second process by switching between the first process and the second process,
wherein the first process is a process that causes the operation performed by the second indicator to be invalid in the case where the indication is received after the detection unit detects the operation performed by the second indicator, and, thereafter, detects the operation performed by the first indicator, and
wherein the second process is a process that causes the operation performed by the first indicator to be invalid in the case where the indication is received after the detection unit detects the operation performed by the second indicator, and, thereafter, detects the operation performed by the first indicator.

3. The display apparatus according to claim 1,
wherein, in the case where the operator of the second operation is the same as the operator of the first operation, the control unit causes the first operation to be invalid until preset time elapses after the detection unit detects the first operation, and
wherein, in a case where a third operation detected by the detection unit and performed by the second indicator is an operation that shows the indication which causes the first operation to be invalid, the control unit causes the first operation to be invalid even though an operator of the third operation is not the same as the operator of the first operation after the preset time elapses.

4. The display apparatus according to claim 3, further comprising:
a storage unit that stores operation history information in which the operation detected by the detection unit and performed by the second indicator is associated with the operator who performs the operation, wherein the control unit deletes information of the operator who performs the operation from the operation history information in a case where the preset time elapses.

5. A display apparatus control method comprising:

detecting an operation performed by a first indicator on an operation surface, and an operation performed by a second indicator on the operation surface; and receiving an indication that causes the operations to be invalid, wherein the operation performed by the second indicator is caused to be invalid in a case where the indication is received after the operation performed by the second indicator is detected, and, thereafter, the operation performed by the first indicator is detected, wherein the step of detecting detects the operation performed by the first indicator in association with an operator who operates the first indicator, and detects the operation performed by the second indicator in association with an operator who operates the second indicator, and wherein, in a case where the step of detecting detects a first operation performed by the second indicator, detects the operation performed by the first indicator, detects a second operation performed by the second indicator, and the second operation is an operation that shows the indication, causing the first operation to be invalid if it is determined that an operator of the second operation is the same as an operator of the first operation, and not causing the first operation to be invalid if it is determined that the operator of the second operation is not the same as the operator of the first operation.

* * * * *